United States Patent
Vornehm et al.

(10) Patent No.: US 8,998,489 B2
(45) Date of Patent: Apr. 7, 2015

(54) SEGMENT ROLLING BEARING, AND AXIAL HYDRAULIC PUMP HAVING THE SEGMENT ROLLING BEARING

(75) Inventors: Harald Vornehm, Ammerndorf (DE);
Peter Decker, Schwebheim (DE);
Michael Pausch, Oberwerrn (DE);
Klaus Drescher, Kuetzberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 563 days.

(21) Appl. No.: 12/796,341

(22) Filed: Jun. 8, 2010

(65) Prior Publication Data
US 2011/0007994 A1  Jan. 13, 2011

Related U.S. Application Data

(60) Provisional application No. 61/185,262, filed on Jun. 9, 2009.

(51) Int. Cl.
| | | |
|---|---|---|
| F16C 32/02 | (2006.01) | |
| F16C 43/04 | (2006.01) | |
| F16C 33/48 | (2006.01) | |
| F16C 19/50 | (2006.01) | |
| F16C 33/46 | (2006.01) | |
| F16C 33/30 | (2006.01) | |

(52) U.S. Cl.
CPC ............... *F16C 19/502* (2013.01); *F16C 33/46* (2013.01); *F16C 33/306* (2013.01); *F16C 2360/42* (2013.01)

(58) Field of Classification Search
USPC .............. 384/2, 49, 470, 572, 560, 576, 580, 384/577, 578, 523
See application file for complete search history.

(56) References Cited

U.S. PATENT DOCUMENTS

| | | | | |
|---|---|---|---|---|
| 1,471,254 | A | * | 10/1923 | Forbes ............................ 384/49 |
| 2,605,622 | A | | 8/1952 | Anderson |
| 2,977,164 | A | * | 3/1961 | Witte ............................. 384/576 |
| 3,024,073 | A | | 3/1962 | Krueger |
| 4,449,445 | A | | 5/1984 | Viles |
| 4,558,962 | A | * | 12/1985 | Meinlschmidt ............... 384/570 |
| 4,627,330 | A | * | 12/1986 | Beck, Jr. ......................... 92/12.2 |
| 4,858,480 | A | | 8/1989 | Rohde et al. |
| 4,907,898 | A | * | 3/1990 | Dickinson ..................... 384/564 |
| 5,011,305 | A | | 4/1991 | Breuer et al. |
| 5,024,143 | A | | 6/1991 | Schniederjan |
| 5,069,560 | A | * | 12/1991 | Niedermeier et al. ........ 384/486 |
| 5,390,584 | A | | 2/1995 | Fritz et al. |
| 5,501,533 | A | * | 3/1996 | Williams et al. .............. 384/572 |

(Continued)

FOREIGN PATENT DOCUMENTS

DE        199 25 834 A1    12/2000

*Primary Examiner* — Thomas R Hannon
*Assistant Examiner* — Adam D Rogers
(74) *Attorney, Agent, or Firm* — Simpson & Simpson, PLLC

(57) ABSTRACT

A segment rolling bearing for an axial hydraulic pump, which can be integrated in a simple way. The segment rolling bearing has an outer raceway carrier, an inner raceway carrier, a plurality of rolling bodies, and a cage. The rolling bodies are arranged in the cage such that they roll between the outer raceway carrier and the inner raceway carrier in such a way that the outer raceway carrier can be pivoted about a common pivot axis with respect to the inner raceway carrier. The cage is connected to the inner and/or to the outer raceway carrier directly and captively in at least one connecting region, at least in the radial direction with respect to the common pivot axis.

14 Claims, 4 Drawing Sheets

(56) References Cited

U.S. PATENT DOCUMENTS

| | | | |
|---|---|---|---|
| 5,528,977 A * | 6/1996 | Goade | 92/71 |
| 5,630,352 A * | 5/1997 | Todd | 92/12.2 |
| 5,810,482 A * | 9/1998 | Aleynik | 384/450 |
| 6,027,250 A | 2/2000 | Reubelt et al. | |
| 6,676,294 B2 * | 1/2004 | Harimoto et al. | 384/2 |
| 6,719,460 B1 | 4/2004 | Becker et al. | |
| 7,178,986 B2 * | 2/2007 | Ohtsuki et al. | 384/470 |
| 7,232,372 B2 | 6/2007 | Nagatani et al. | |
| 7,597,481 B2 * | 10/2009 | Scherpf | 384/470 |
| 7,670,058 B2 * | 3/2010 | Schorr et al. | 384/580 |
| 7,793,582 B2 | 9/2010 | Becker et al. | |
| 8,021,235 B2 * | 9/2011 | Tinnin et al. | 464/167 |
| 8,167,503 B2 * | 5/2012 | Ueno | 384/576 |
| 8,172,464 B2 * | 5/2012 | Matsushita | 384/571 |
| 8,376,615 B2 * | 2/2013 | Becker et al. | 384/2 |
| 2006/0110082 A1 * | 5/2006 | Tvaruzek | 384/2 |
| 2006/0291765 A1 * | 12/2006 | Hayward et al. | 384/572 |
| 2009/0126561 A1 | 5/2009 | Becker et al. | |
| 2009/0208161 A1 * | 8/2009 | Jauernig et al. | 384/572 |
| 2010/0278463 A1 | 11/2010 | Becker et al. | |

* cited by examiner

SEGMENT ROLLING BEARING, AND AXIAL HYDRAULIC PUMP HAVING THE SEGMENT ROLLING BEARING

This application claims the priority of US 61/185,262 filed Jun. 9, 2009 which is incorporated by reference herein.

BACKGROUND OF THE INVENTION

The invention relates to a segment rolling bearing having an outer raceway carrier, having an inner, raceway carrier, having a plurality of rolling bodies and having a cage, the rolling bodies being arranged in the cage such that they roll between the outer raceway carrier and the inner raceway carrier in such a way that the outer raceway carrier can be pivoted about a common pivot axis with respect to the inner raceway carrier. The invention also relates to an axial hydraulic pump having the segment rolling bearing.

Segment rolling bearings usually have an inner raceway section, an outer raceway section and a plurality of rolling bodies which are mounted such that they roll between the inner and outer raceway sections. The segment rolling bearings typically extend only over a segment of a circle, such as over a segment of 45° or 60°. As a result of this structural characteristic, segment rolling bearings make only mutual pivoting of the raceway sections about a restricted pivoting angle possible. The guidance of the rolling bodies is given particular consideration, since it cannot be precluded during operation, in the case of an oscillating relative movement of the raceway sections with respect to one another, that the rolling bodies are distributed non-uniformly or are placed at the edges.

Document US 2006/0291765 relates to a full-type segment rolling bearing having two bearing shells. Synchronization of the bearing shells is achieved by a gearwheel which is arranged at the end and meshes with teeth in the bearing shells. In order to space the rolling bodies apart from the gearwheel, a spacer element is provided which is inserted between the gearwheel and an end-side rolling body. In one possible development of this segment rolling bearing, it is proposed to snap the spacer element into the bearing shells, in order to form a modular antifriction bearing assembly.

Document DE 199 258 34 A1 which seems to form the closest prior art relates to a swash plate pivot bearing for a hydraulic axial piston engine. Antifriction bearing segments which are held in arcuate cages and have a supporting journal for restoring the cage in the case of a deviation from its setpoint position are arranged between a hollow-cylindrical bearing face in a housing for the swash plate and a cylindrical bearing face on the swash plate. These supporting journals are oriented parallel to the antifriction bearing pockets, protrude beyond the cage width and are connected to a return device. Otherwise, the antifriction bearing segments are arranged freely between the bearing faces.

BRIEF SUMMARY OF THE INVENTION

The invention is based on the object of proposing a segment rolling bearing, in particular for an axial hydraulic pump, which can be integrated in a simple way.

In the context of the invention, a segment rolling bearing is proposed which is preferably suitable and/or configured for an axial hydraulic pump. In particular, the segment rolling bearing is configured for mounting a swash plate in the axial hydraulic pump.

The segment rolling bearing preferably extends over a restricted circle segment, for example over an angular range less than or less than or equal to 180° and, in particular, less than or less than or equal to 90°. The segment rolling bearing has an outer raceway carrier, an inner raceway carrier and a plurality of rolling bodies in a cage, the rolling bodies being arranged in the cage such that they roll between the outer and the inner raceway carriers, with the result that they can be pivoted with respect to one another about a common pivot axis. The raceway carriers are arranged coaxially and/or concentrically with respect to one another, with the result that substantially radially directed forces can be transmitted by the rolling bodies. In the most general development of the invention, the raceway carriers may assume any desired design, in one piece or in multiple pieces, or can even form part of a larger assembly, such as of a housing or a swash plate. The raceways on the raceway carriers are preferably restricted to an angular range of less than or less than or equal to 180° and, in particular, less than or less than or equal to 90°. The rolling bodies are preferably configured as cylindrical rollers; in alternative embodiments, other rollers or even balls may be used as rolling bodies. The cage may be configured in one piece or in multiple pieces and preferably provides one pocket for each rolling body, in particular for each cylindrical roller. In particular, the cage is arranged at least in sections between the rolling bodies and/or is configured for spacing some or even all the rolling bodies apart from one another. The cage preferably extends over all the rolling bodies of the segment rolling bearing.

In the context of the invention, it is proposed that the cage is connected to the inner and/or to the outer raceway carrier directly, in particular without intermediate elements, and captively in at least one connecting region, at least in the radial direction with respect to the common pivot axis. The connecting region therefore ensures that the cage is not detached in an uncontrolled or undesired manner from the inner and/or the outer raceway carrier in the radial direction, in particular radially to the outside or radially to the inside.

The invention is based on the consideration that the mounting of the segment rolling bearings has previously been made more difficult by the fact that the components outer raceway carrier, inner raceway carrier and cage could fall apart in an unsecured manner. As a result of the development according to the invention, the cage can be connected to one of the raceway carriers in a first mounting step and is secured as a result. In a possible further step, the cage can be connected to the other raceway carrier in a similar way.

It is particularly preferred if the cage is connected captively to both raceway carriers in the depicted way, with the result that the cage forms a mechanical coupling element between the two raceway carriers, the cage acting on and/or engaging into the raceway carriers directly. It is particularly preferred if the segment rolling bearing forms a self-supporting structural unit which, during mounting, can be removed simply, for example from a packaging, and mounted.

In one preferred structural embodiment of the invention, at least one raceway carrier, preferably both raceway carriers, is configured as a running ring segment. The running ring segments can also be called segmented antifriction bearing shells and are particularly preferably produced by a cold working process.

In the context of the present disclosure, the raceway carrier without more precise specification is understood to be any desired raceway carrier, that is to say the inner or the outer raceway carrier or both raceway carriers.

In one preferred embodiment of the invention, the raceway carrier is connected positively on one or both sides to the cage at least in the radial direction. In one direction, the securing results from the positioning of the cage relative to the raceway carrier; the cage is thus secured positively radially to the outside by the outer raceway carrier and to the inside by the inner raceway carrier. In the other direction, the securing is effected by the connecting region. In addition, it is possible that the raceway carrier is also secured positively to the cage in the circumferential direction and/or in the axial direction, in order also to provide a captive securing means in these directions. However, these refinements are optional.

In one particularly preferred structural realization, the raceway carrier and the cage can be connected and/or are connected releasably at least in the radial mounting direction, which can be implemented, for example, by an undercut region, clip connection, latching lug connection, etc. Here it is preferred, depending on the application, if this positive connection makes a relative movement of the raceway carriers possible in the circumferential direction.

In one particularly preferred structural realization, the cage has at least one lug section with an axially outwardly directed lug, that is to say directed away from the rolling bodies, which lug engages into an undercut region in the raceway carrier, in which the lug section can be fixed positively in the radial direction.

In order to ensure the relative movement of the raceway carriers with respect to one another in the circumferential direction, it is particularly preferred if the lug section extends around the rotational axis in the circumferential direction, for example with a constant cross section at least in sections. At least, the lug section should be received in the undercut region in such a way that the pivoting movement as intended between the two raceway carriers is not impeded. The extent of the lug section in the circumferential direction is preferably substantially greater than the extent of the lug section in the radial direction or axial direction.

With the aim of saving production costs, it is particularly preferred if the undercut region is manufactured without the removal of material. In particular, the undercut section is realized by a cold working process.

In one possible development of the invention, the lug section is configured as a snap-in lug section which can be deflected in the axial direction. During the insertion of the snap-in lug section into the undercut section, it can be axially deflected elastically and facilitate mounting as a result. It lies within the scope of the invention that only some of the lug sections are configured as snap-in lug sections; other lug sections may also be realized as rigid sections.

In one possible structural implementation of the invention, the segment rolling bearing has a synchronizing unit which synchronizes the inner raceway carrier, the outer raceway carrier and the cage with respect to one another and/or defines their relative position with respect to one another. It is always important in the case of segment rolling bearings to keep the relative positioning of these three components under control, as otherwise it is to be feared that the cage migrates with the rolling bodies in the circumferential direction out of a setpoint position. It is therefore preferred to also provide a synchronizing unit which maintains and corrects this relative position, if applicable.

The synchronizing unit is particularly preferably realized by means of a radially oriented control pin as a control section which can be arranged displaceably in the axial direction in a pin section as a receiving section in the cage. The two free ends of the control pin engage into oblique slots as guide elements in the raceway carriers, which oblique slots extend in an angled manner with respect to a radial plane of the pivot axis in such a way, that the control pin is always guided in the intersection point of the elongate slots in a radial projection. In particular, the oblique slots are made in the inner raceway carrier and in the outer raceway carrier at the same angle with respect to the radial plane but so as to extend in opposite directions to one another. Therefore, in its movement in the oblique slots and in the elongate slot, the control pin permits geometrically only one possible position of the two raceway carriers and of the cage.

In one preferred development of the invention, the connecting region is arranged on the end side with respect to the cage, in particular on the end side with respect to one row of the rolling bodies and/or adjacent in the axial direction to the synchronizing unit, in particular to the elongate slot and/or pin section. The end region of the cage is distinguished at least by a double function, firstly the control pin being guided and secondly the connecting regions being positioned. The cage, connecting regions and pin section are particularly preferably configured in one piece. In possible embodiments, a synchronizing unit and/or connecting regions are/is arranged on each end side of the cage. Connecting regions are particularly preferably positioned in each end region of the cage for the captive connection to the inner raceway carrier and the outer raceway carrier.

As an alternative to this, the connecting regions may be arranged at other positions, for example centrally on the cage in the circumferential direction.

In one possible development of the invention, the cage has axial securing sections, in particular on the cage webs, which are arranged in an axial projection of the segment rolling bearing so as to overlap with a rim of the raceway carrier. As a result of the overlap on one or both sides, the cage is additionally arranged captively in the axial direction in the rolling body space. These axial securing sections are also preferably connected integrally with the cage.

In one preferred development of the invention, the control section is formed by a rotationally symmetrical control pin. Although a different basic geometry of the control pin is also conceivable in principle, a rotationally symmetrical control pin can be produced simply and more cost-effective. As an alternative or in addition to the rotationally symmetrical configuration, the control section or control pin may have a center region which is of broader configuration than two end regions of the control section or control pin, that is to say a step is produced between the center region and the end regions. This step may firstly cause the control section or control pin to fall out of the inner ring and the outer ring. Secondly, a step of this type also represents a guide face for guiding the control section or control pin between the inner ring and the outer ring. In the case of a rotationally symmetrical control section or control pin, the center region and end regions are in each case of rotationally symmetrical configuration and the center region has a greater diameter than the two end regions.

The above-described segment rolling bearing is particularly preferably configured for controlling a swash plate in an axial hydraulic pump.

A further subject matter of the invention relates to an axial hydraulic pump which has an adjusting mechanism for adjusting the pump power as a result of a change in an angle of attack of a swash plate, the adjusting mechanism being configured for adjusting the angle of attack and the adjusting mechanism exhibiting a segment rolling bearing, as described in the preceding text and/or according to one of the preceding claims.

BRIEF DESCRIPTION OF THE DRAWINGS

Further advantages, features and effects of the invention result from the following description of one preferred exemplary embodiment of the invention and the appended figures, in which.

DETAILED DESCRIPTION OF THE INVENTION

Parts which correspond to one another in the figures have been given in each case designations which correspond to one another.

Figure 1:
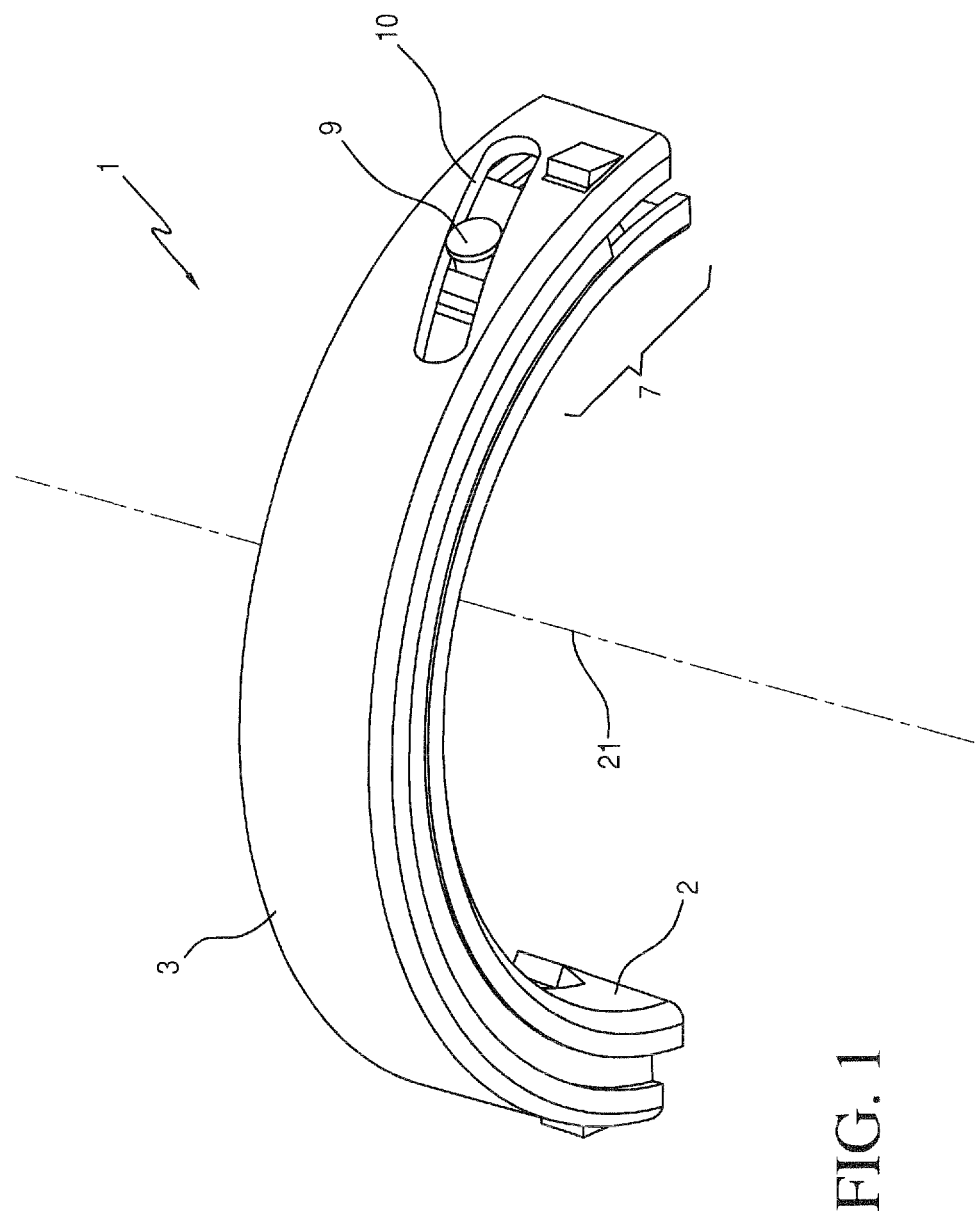
FIG. 1 shows a schematic three-dimensional illustration of a segment rolling bearing as a first exemplary embodiment of the invention.

FIG. 1 shows a segment rolling bearing 1 in a schematic three-dimensional plan view. The segment rolling bearing 1 is configured, for example, to be installed in an axial hydraulic pump, as is described, for example, in document DE 199 258 34 A1.

Figure 2:
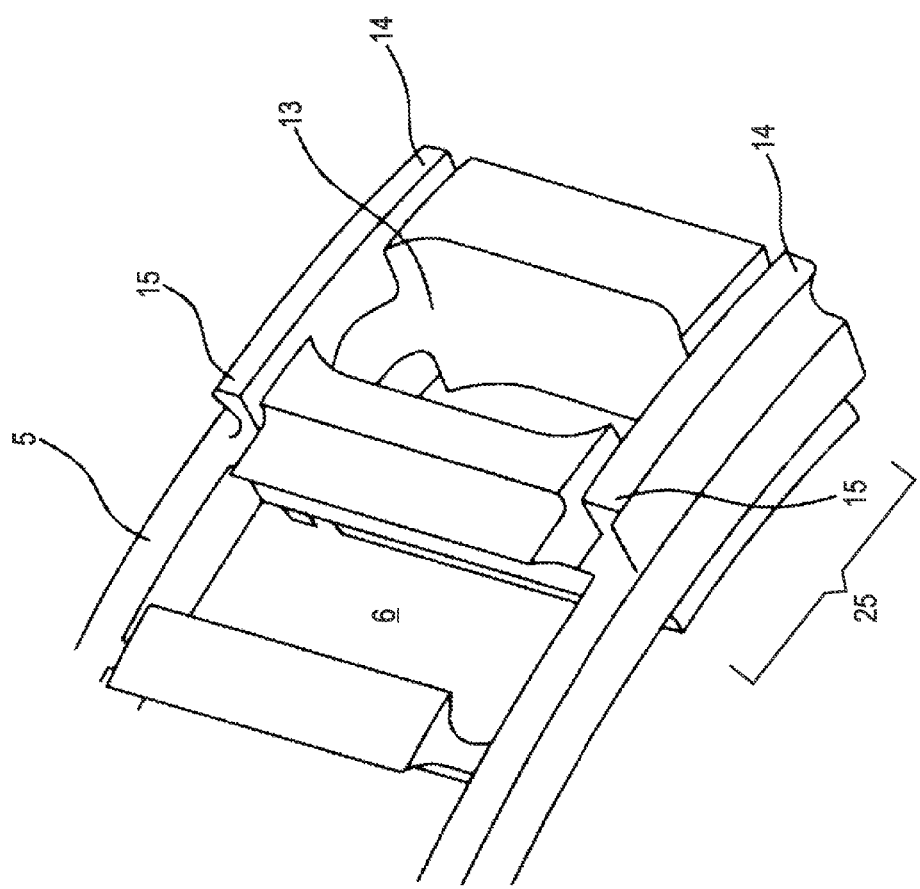
FIG. 2 shows a schematic three-dimensional plan view of the end section of the cage in the segment rolling bearing in FIG. 1.
Figure 4:
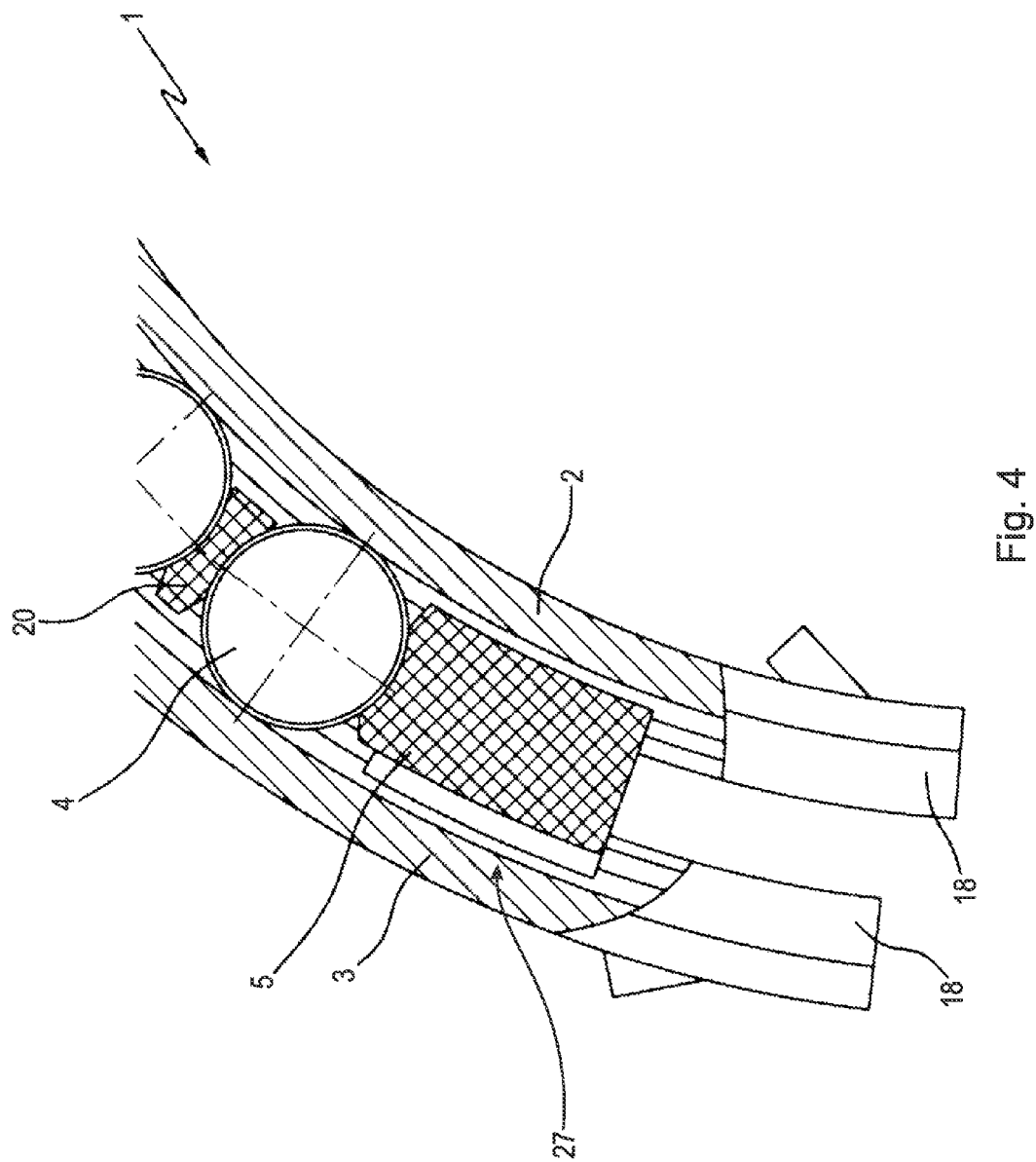
FIG. 4 shows a partially sectioned, diagrammatic side view of the segment rolling bearing of the preceding figures.

The segment rolling bearing 1 has an inner ring 2 and an outer ring 3 which are configured as raceway carriers for a plurality of rolling bodies in the form of cylindrical rollers 4 (FIG. 4). The segment rolling bearing 1 or inner ring 2 and outer ring 3 extends/extend only over a circle segment of less than or equal to 180°. The inner ring 2 and the outer ring 3 are mounted such that they can be pivoted with respect to one another in the circumferential direction about a pivot axis (not shown). The cylindrical rollers 4 are arranged in a cage 5, as is shown, for example, in FIG. 2 in the region of the end section. The cage 5 has cage pockets 6 for receiving the cylindrical rollers 4 and a first end portion 25 and a second end portion 27 (shown in FIGS. 2 and 4) each at a corresponding circumferential end of the row of rolling bodies and is circumferentially outside of the row of rolling bodies.

Figure 3:
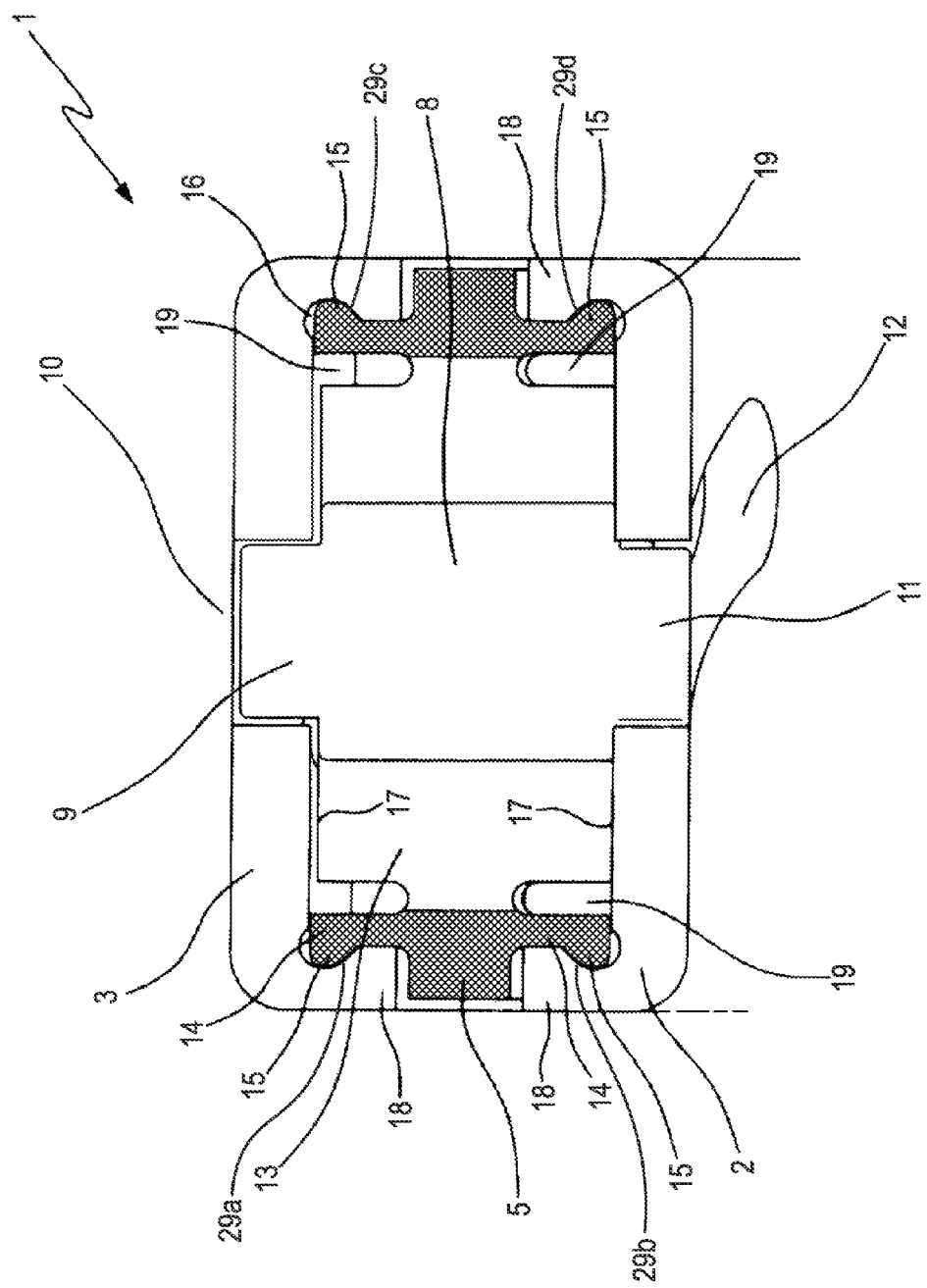
FIG. 3 shows a schematic section in a radial plane with respect to the pivot axis of the segment rolling bearing of the preceding figures.

In order to ensure the relative positioning between the inner ring 2, the outer ring 3 and the cage 5 end/or cylindrical rollers 4, the segment rolling bearing 1 exhibits a synchronizing device 7 in an end region. This synchronizing device 7 has a control pin 8 (FIG. 3) which is oriented radially, The control pin 8 engages with an outer end section 9 into an outer oblique slot 10 of the outer ring 3, which is arranged angled relative to a radial plane of the pivot axis 21. An inner end section 11 is arranged on the radially inner side, which inner end section 11 engages in a simliar manner into an inner oblique slot 12 of the inner ring 2, which is likewise arranged angled with respect to the radial plane. The intermediate angies between the outer oblique slot 10 and the radiai plane and the inner obiique. slot 12 and the radial plane are identical in magnitude, for example between 5° to 30°, but the oblique slots 10, 12 are oriented in opposite directions, so that a cross results in a radial pian view or projection, the intersection point forming the only possible position of the control pin 8 with the outer end section 9 or inner end section 11.

The control pin 8 is configured as a cylindrical component and, in the center section, has a cylindrical center part which is widened with respect to the end sections 9, 11. The length of the control pin 8 is selected such that it does not protrude beyond the inner ring 2 or outer ring 3. The center part of the control pin 8 has a greater diameter than the end sections 9, 11 for two reasons: firstly, it is secured against falling out as a result, and secondly guide faces are formed between the control pin 8 and the inner ring 2 or outer ring 3, which guide faces ensure that the control pin 8 cannot tilt. In contrast, the diameters of the end sections 9, 11 are configured in such a way that they engage into the oblique slots 10, 12 with little play. In order, in the case of mutual pivoting of the inner ring 2 and the outer ring 3, to make a movement of the control pin 8 possible transversely with respect to the pivoting direction or circumferential direction, an axially extending elongate slot 13 for receiving the control pin 8 or its center part is made in the cage 5 in the end region.

Lug sections 14 are formed integrally on the cage 5 axially on the outside in the region of the elongate slot 13, which lug sections 14 have axially outwardly pointing lugs 15 and extend in the circumferential direction with a constant or virtually constant cross section. The lug sections 15 can engage into undercuts 16 which are formed in the inner ring 2 and/or outer ring 3 between a raceway 17 and a holding rim 18 thereby forming radial stops 29a-29d. The holding lugs 15 and the undercuts 16 interact in such a way that the cage 5 can be clipped into the inner ring 2 and/or outer ring 3, and nevertheless the inner ring 2 and the outer ring 3 can be pivoted in the circumferential direction. The length of the lug sections 14 in the circumferential direction is greater than the envisaged relative pivoting angle between the inner ring 2 and the outer ring 3.

In order to make flexible yielding of the lug sections 14 in the axial direction possible, recesses 19 are provided which extend as grooves in the circumferential direction. Firstly, it is possible that each lug section 14 is configured elastically via a recess 19, and secondly it is also possible that only some of the lug sections 14 can be deflected in the axial direction.

The undercuts 16 are configured in such a way that they can be rolled over by the cylindrical rollers 4. In this embodiment, the undercuts 16 have been manufactured without the removal of material and have been produced, in particular, by a cold working process.

The cage 5 therefore forms thickened portions in its end regions, which thickened portions, in a longitudinal section along the rotational axis, assume, for example, more than 70%, preferably more than 80% of the rolling body space between the inner ring 2 and the outer ring 3 and on which the lug sections 14 are formed integrally and which at the same time carry the elongate slot 13.

FIG. 4 shows a possible further development of the invention, the webs 20 of the cage 5 being configured in the radial extent in such a way that they overlap with the holding rims 18 in the radial direction on both sides and in this way avoid the cage 5 migrating out axially.

The invention claimed is:

1. A segment rolling bearing, comprising:
an outer raceway carrier;
an inner raceway carrier, the outer raceway carrier and the inner raceway carrier being segment carriers that extend only over a circular segment;
a plurality of rolling bodies arranged in circumferential succession and forming a row of rolling bodies; and
a cage, the rolling bodies being arranged in the cage such that the rolling bodies roll between the outer raceway carrier and the inner raceway carrier in such a way that the outer raceway carrier can be pivoted about a common pivot axis with respect to the inner raceway carrier, the cage having a first end portion and a second end portion each at a corresponding circumferential end of the row of rolling bodies that is circumferentially outside of the row of rolling bodies,
wherein the cage is directly connected to at least one of the segment carriers, the direct connection being only at the first end portion and the second end portion, and
wherein at a first circumferential end of the row of rolling bodies the first end portion and at least one of the segment carriers is configured to form a first radial stop to limit movement of the cage and the at least one of the segment carriers relative to one another in a radial direction and at a second circumferential end of the row of rolling bodies the second end portion and the at least one of the segment carriers is configured to form a second radial stop to limit movement of the cage and the at least one of the segment carriers relative to one another in the radial direction.

2. The segment rolling bearing according to claim 1, wherein the segment rolling bearing forms a self-supporting structural unit.

3. The segment rolling bearing according to claim 1, wherein the first radial stop comprises the first end portion, the first end portion having a first lug section, and the at least one of the segment carriers having a first undercut section, which axially receives the lug first section, and the second radial stop comprises the second end portion, the second end portion having a second lug section, and the at least one of the segment carriers having a second undercut section, which axially receives the second lug section.

4. The segment rolling bearing according to claim 3, wherein the first lug section and the second lug section extend around a rotational axis in a circumferential direction.

5. The segment rolling bearing according to claim 3, wherein the first undercut section and the second undercut section are manufactured without removal of material.

6. The segment rolling bearing according to claim 3, wherein the first lug section and the second lug section are snap-in lug sections which can be deflected in an axial section.

7. The segment roller bearing according to claim 3, further comprising a holding rim that extends radially from the at least one of the segment carriers and prevents the cage from migrating axially, the first and the second undercut sections of the at least one of the segment carriers arranged on the holding rim.

8. The segment rolling bearing according to claim 1, further comprising:
a synchronizing unit which synchronizes the inner raceway carrier, the outer raceway carrier and the cage with respect to one another.

9. The segment rolling bearing according to claim 8, wherein the synchronizing unit comprises a receiving slot formed in the cage, and a control section extending into each of a first slot in the outer raceway carrier and a second slot in the inner raceway carrier, the control section being displaceable within each of the first slot and the second slot in such a way that the outer raceway carrier and the inner raceway carrier are synchronized with respect to one another.

10. The segment rolling bearing according to claim 1, wherein the cage has axial securing sections which, in an axial projection, are arranged congruently with holding rims of the inner raceway carrier and/or the outer raceway carrier.

11. An axial hydraulic pump, comprising:
the segment rolling bearing according to claim 1.

12. The segment roller bearing according to claim 1, wherein at least one of the end portions is a thickened portion that has a greater thickness in a radial direction than a remainder of the cage outside of the at least one of the end portions.

13. The segment roller bearing according to claim 1, wherein the radial stops each comprise at least one of an undercut region and a lug connection.

14. A segment rolling bearing, comprising:
an outer raceway carrier;
an inner raceway carrier, the outer raceway carrier and the inner raceway carrier being segment carriers that extend only over a circular segment of less than or equal to 180°;
a plurality of rolling bodies;
a cage; and
a synchronizing unit which synchronizes the inner raceway carrier, the outer raceway carrier and the cage with respect to one another,
the rolling bodies being arranged in the cage such that the rolling bodies roll between the outer raceway carrier having a first guide slot and the inner raceway carrier having a second guide slot in such a way that the outer raceway carrier can be pivoted about a common pivot axis with respect to the inner raceway carrier,
wherein the cage is connected to at least one of the segment carriers directly and captively in at least one connecting region, at least in a radial direction with respect to the common pivot axis, whereby the cage is held securely in the at least one of the segment carriers during mounting of the segment rolling bearing,
wherein the cage has an elongate slot, in which a control section is mounted displaceably, the control section comprising an outer end section and an inner end section, the outer end section and the inner end section slidingly arranged within the first guide slot and the second guide slot, respectively, in such a way that the outer raceway carrier and the inner raceway carrier are synchronized with respect to one another, and
wherein the control section is formed by a rotationally symmetrical control pin with a center region having a greater diameter than the outer end section and the inner end section.

* * * * *